United States Patent
Singh et al.

(10) Patent No.: US 11,055,819 B1
(45) Date of Patent: Jul. 6, 2021

(54) DUALPATH DEEP BACKPROJECTION NETWORK FOR SUPER-RESOLUTION

(71) Applicant: Amazon Technologies, Inc., Seattle, WA (US)

(72) Inventors: Kunwar Yashraj Singh, Bellevue, WA (US); Paulo Mendonca, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/143,925

(22) Filed: Sep. 27, 2018

(51) Int. Cl.
*G06T 3/40* (2006.01)
*G06T 5/00* (2006.01)

(52) U.S. Cl.
CPC .......... *G06T 3/4053* (2013.01); *G06T 3/4046* (2013.01); *G06T 5/002* (2013.01);
(Continued)

(58) Field of Classification Search
CPC ........ G06N 3/0454; G06N 3/08; G06N 3/084; G06N 3/04; G06N 3/0481; G06N 3/0472; G06N 5/046; G06N 3/0445; G06N 7/005; G06N 20/10; G06N 20/00; G06N 3/082; G06N 3/088; G06N 20/20; G06N 3/063; G06N 3/02; G06N 5/022; G06T 2207/20084; G06T 2207/20081; G06T 7/11; G06T 7/0012; G06T 2207/10024; G06T 7/0002; G06T 5/002; G06T 2207/20076; G06T 2207/30168; G06T 2207/30201; G06T 5/50; G06T 7/90; *G06T 5/003* (2013.01); *G06T 5/009* (2013.01); *G06T 2207/10016* (2013.01); *G06T 2207/20081* (2013.01)

(56) References Cited

U.S. PATENT DOCUMENTS 10,467,526 B1 * 11/2019 Appalaraju .......... G06K 9/6256
2012/0213452 A1 * 8/2012 Matsuyama .......... G06T 3/4053
382/294

(Continued)

FOREIGN PATENT DOCUMENTS

CN    109064405    * 12/2018

OTHER PUBLICATIONS

Haris, Muhammad, et al., "Deep Back-Projection Networks for Super-Resolution", IEEE, Mar. 7, 2018., 10 pages.
(Continued)

*Primary Examiner* — Golam Sorowar
(74) *Attorney, Agent, or Firm* — Nicholson De Vos Webster & Elliott LLP (57) ABSTRACT

Techniques for machine learning-based image super-resolution are described. A Dual Path Deep Back Projection Network can be used to enhance an input image. For example, the model may be trained to perform image super-resolution, remove artifacts, provide filtering or low light enhancement, etc. Classification may be performed on the resulting enhanced images to identify objects represented in the images. The model may be trained using a dataset that includes groups of images: an original image and an enhanced image. The model may use both residual and dense connectivity patterns between each successive back projection blocks to improve construction of a high-resolution output image from a low resolution input image. The enhanced images increase classification accuracy for input images having low image resolution.

14 Claims, 9 Drawing Sheets

(58) Field of Classification Search
CPC . G06T 2207/10028; G06T 2207/20016; G06T 2207/10016; G06T 2207/10081; G06T 3/4053; G06K 9/4628; G06K 9/6256; G06K 9/6271; G06K 2209/05; G06K 9/6267; G06K 9/627; G06K 9/6232; G06K 9/6257; G06K 9/6273; G06K 9/6274; G06K 9/66; G06K 9/00201; G06K 9/6262; G06K 9/4671; G06K 9/623; G06K 9/4609; G06K 9/6215; G06K 9/6255; G06K 9/6277
See application file for complete search history.

(56) References Cited

U.S. PATENT DOCUMENTS

| | | | |
|---|---|---|---|
| 2016/0328630 A1* | 11/2016 | Han | G06K 9/6272 |
| 2016/0358321 A1* | 12/2016 | Xu | H04N 17/004 |
| 2019/0045168 A1* | 2/2019 | Chaudhuri | G06T 1/20 |
| 2019/0122115 A1* | 4/2019 | Wang | G06K 9/036 |
| 2019/0130188 A1* | 5/2019 | Zhou | G06T 7/248 |
| 2019/0138838 A1* | 5/2019 | Liu | G06K 9/6271 |
| 2019/0197667 A1* | 6/2019 | Paluri | G06N 3/084 |
| 2019/0355102 A1* | 11/2019 | Lin | G06T 5/005 |
| 2019/0370936 A1* | 12/2019 | Zhang | G06T 3/4046 |

OTHER PUBLICATIONS

Pandey, Ram Krishna, et al., "Efficient document-image super-resolution using convolutional neural network", Indian Academy of Sciences, Mar. 6, 2018, 6 pages.

* cited by examiner

DUALPATH DEEP BACKPROJECTION NETWORK FOR SUPER-RESOLUTION

BACKGROUND

The field of machine learning has become widely acknowledged as a likely significant driver of the future of technology. Organizations everywhere now seek to use machine learning techniques to address a wide variety of problems, such as optimizing aspects of their products, processes, user experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

Currently, low resolution image and/or video data is often collected and used for various purposes (e.g., surveillance video). Individual frames or images of such low resolution data is often blurry, may include artifacts, or other imperfections that make classification or other image analysis of the data difficult.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for machine learning-based image enhancement are described. According to some embodiments, a machine learning model, such as a Dual Path Deep Back Projection Network, can be used to enhance an input image. For example, the model may be trained to perform image super-resolution, remove artifacts, provide filtering or low light enhancement, etc. Additionally, in some embodiments, classification may be performed on the resulting enhanced images to identify objects represented in the images. The model may be trained using a dataset that includes pairs (or other groups) of images: an original image and an enhanced image. The model may use both residual and dense connectivity patterns between successive back projection blocks to improve construction a high-resolution output image from a low resolution input image. Other enhancements may include generating a well-lit output image from a low light input image, removing motion blur or artifacts from an input image, etc. Embodiments provide an improved signal to noise ratio over past methods while reducing the number of parameters, improving performance of the system. Additionally, the enhanced images increase classification accuracy for input images having low image resolution.

Figure 1:
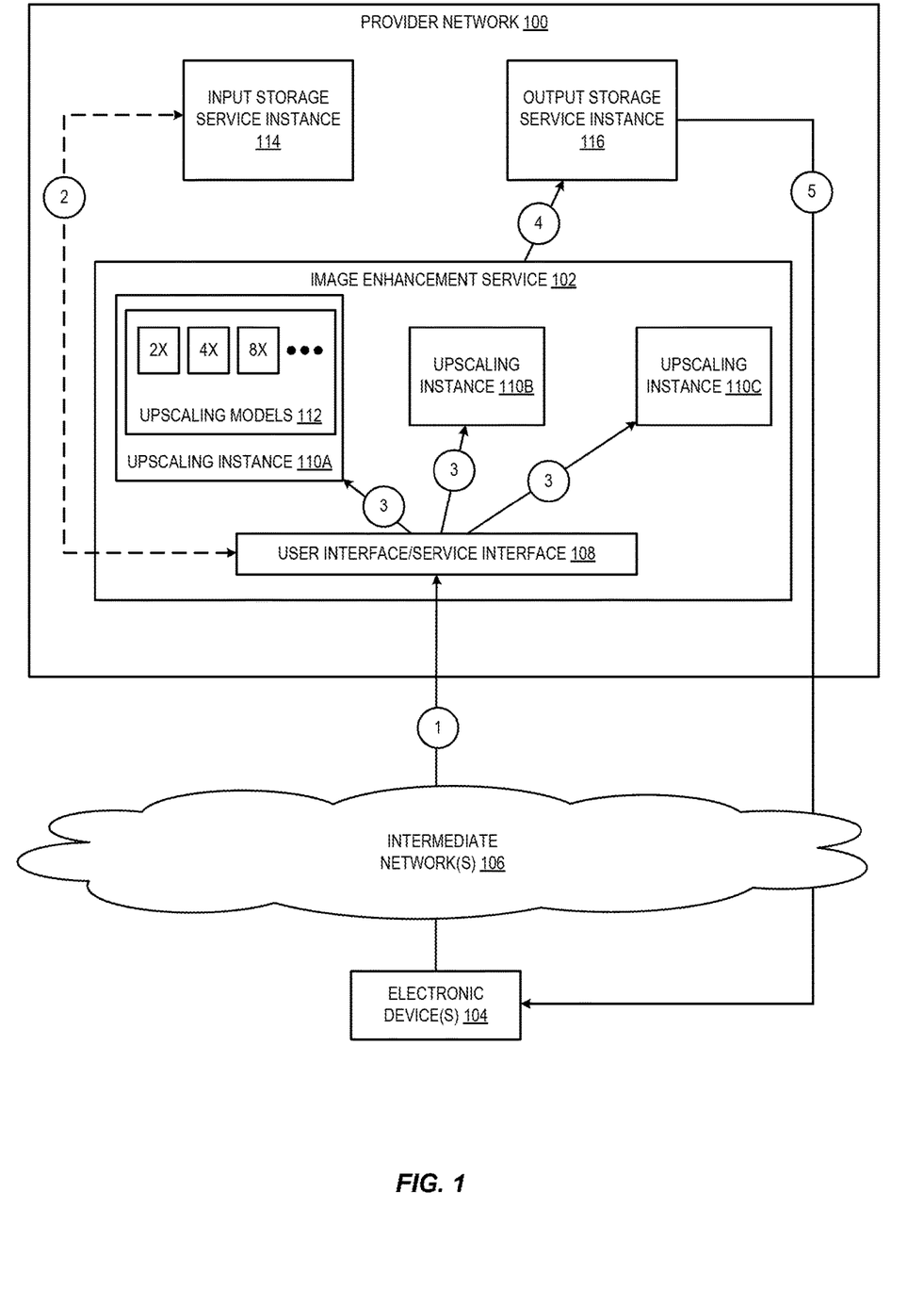
FIG. 1 is a diagram illustrating an environment for machine learning-based image super-resolution according to some embodiments.

FIG. 1 is a diagram illustrating an environment for machine learning-based image super-resolution according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "users") of provider networks 100 may utilize one or more user accounts that are associated with a user account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to users.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, at numeral 1, a user using electronic device 104 can send a request to image enhancement service 102 to enhance image data. The request may include one or more images or a reference to the one or more images stored in a data store (such as input storage service instance 114). In some embodiments, the one or more images may be frames sampled from video data (e.g., surveillance video or other low resolution video source). Additionally, or alternatively, any image or video data may be used to provide images to image enhancement service 102. In some embodiments, the request can be received through a user interface 108 which serves as a front-end for users to access the image enhancement service. User interface 108 may include a graphical user interface, application programming interface, console, or other user interface. In some embodiments, an application executing on electronic device 104 may implement a user interface that communicates to image enhancement service 102. Although embodiments are generally described as being accessed through a user interface 108 by a user, in various embodiments, image enhancement service 102 may be accessed by other services through a service interface. For example, an image storage service may store low resolution copies of images and may provide those images to image enhancement service 102 through a service interface to be upscaled and provided to a user automatically. Similarly, a surveillance service may provide low resolution surveillance images and/or video data to the image enhancement service for automated upscaling and classification.

The request received at numeral 1 may include the image to be enhanced or a reference to the image. If a reference is included, at numeral 2, the image can be retrieved from the data store in which it is stored. For example, the reference may be a uniform resource locator (URL) or other address information for a storage location of the image, such as an input storage service instance 114. In some embodiments, the request may also include an enhancement factor. For example, for image super-resolution, the request may include a scaling factor (e.g., 2×, 3×, 4×, 5.5×, 8×, 16×, 32×etc.). At numeral 3, the image can be passed to an upscaling instance 110A-110C to perform the upscaling. As shown in FIG. 1, each upscaling instance may include multiple upscaling models 112, each upscaling model trained for a different upscaling factor. For example, if a request for image super-resolution of 2× is received, it can be provided to an upscaling instance with a 2× upscaling model to perform super-resolution.

In some embodiments, each upscaling model can be trained with a training dataset that includes image pairs: a low resolution image and a high resolution image based on the scaling factor. An example of such a dataset includes the DIV2K dataset, released by Timofte et al., though other datasets including pairs of images may also be used. Based on how the training images were degraded, the dataset can be divided into two different tracks namely, bicubic downscaling and unknown downscaling. In the bicubic downscaling track, the training images can be generated by downsampling each high resolution image using various downsampling techniques (such as the MATLAB imresize function with bicubic as the option). Each model can be trained for a particular scaling factors using the training dataset. In some embodiments, the training dataset may be augmented by extracting random patches of the images and flipping the patches horizontally, vertically, and both horizontally and vertically. In some embodiments, a model trained to upscale at one scaling factor can be further trained to instead upscale at a different scaling factor using additional training data (e.g., another dataset for the new scaling factor or by synthetically generating training data from the existing dataset for the new scaling factor).

Once the low resolution input image has been provided to the appropriate upscaling model, the upscaling model can output an enhanced output image which has been upscaled by the requested scaling factor. At numeral 4, the output image can be stored in an output storage service instance 116, or other storage location that is accessible to the user via electronic device 104. At numeral 5, the user can retrieve the upscaled image from the output storage service instance 116 and use the output image for further processing. For example, traditional upscaling techniques result in a loss of information, in particular, a loss of high frequency information (e.g., edges and other sharp features). This makes object classification of the upscaled images unreliable. However, as described further below, embodiments utilize machine learning techniques to enhance high frequency information during upscaling, enabling further processing, such as object classification, to be more reliably and efficiently performed on the output images.

Figure 2:
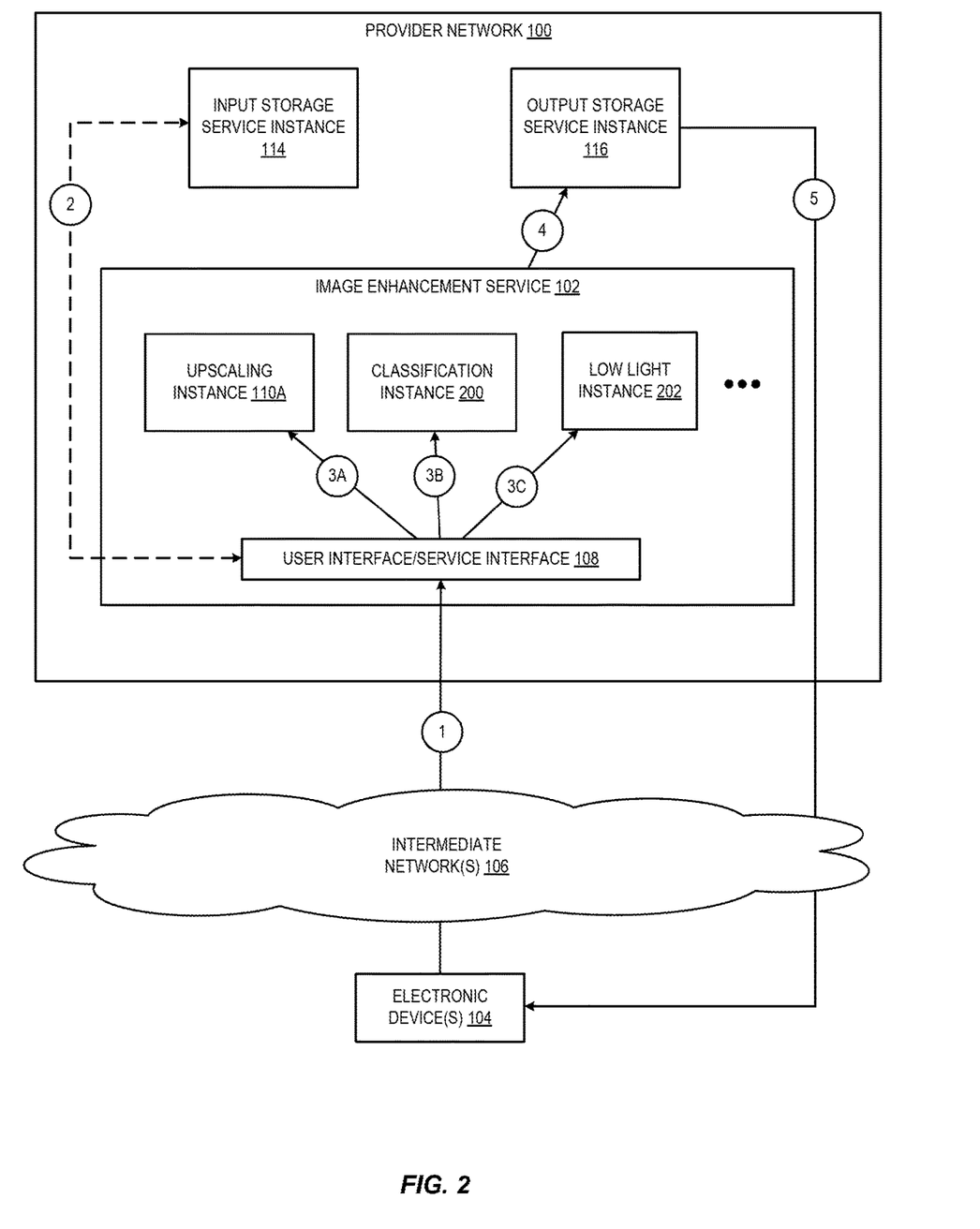
FIG. 2 is a diagram illustrating an environment for machine learning-based image enhancement according to some embodiments.

FIG. 2 is a diagram illustrating an environment for machine learning-based image enhancement according to some embodiments. As described above, image enhancement service can provide upscaling services to images using various machine learning models trained according to a particular scaling factor. In some embodiments, image enhancement service 102 may include additional enhancement services for input image data. At shown at numeral 1, a user using electronic device 104 can send a request to image enhancement service 102 to enhance image data. The request received at numeral 1 may include the image to be enhanced or a reference to the image. If a reference is included, at numeral 2, the image can be retrieved from the data store in which it is stored. In some embodiments, the request may include an indication of the enhancement service to be provided. For example, a request to perform upscaling can be provided to upscaling instance 110A, as described above and shown at numeral 3A. In some embodiments, a request to perform classification can be provided to a classification instance 200 at numeral 3B and a request to perform low light enhancement can be sent to low light instance 202 at numeral 3C.

The models described herein can be trained on various datasets that comprise image pairs. For example, the low light enhancement instance 202 can include a model trained using a dataset that includes normal light image and low light image pairs. These can be constructed synthetically by reducing the brightness of normal light images. Once trained, a low light input image can be provided to the model, and the model can output a reconstructed normal light output image. Similarly, models can be trained to automatically add or remove image filters, such as those used in social media posts. In such examples, pairs of filtered and non-filtered images can be used to train the machine learning model. Once trained, a filtered image can be provided to the model and an unfiltered output image can be reconstructed. Likewise, an unfiltered image can be provided to the model and an output filtered image can be reconstructed. Additionally, or alternatively, these models can be extended to include other features, such as classification. For example, classification instance 200 may include a super-resolution model as described above, the results of which are output to a classifier trained to label the image data and/or objects represented in the image data. In some embodiments, a user may provide a model trained for image enhancement (e.g., using the user's training data) or the user can provide a training dataset to be used by the service provider 100 to train a model for the user. Other post processing may also be performed in addition, or as an alternative, to classification, such as object detection and image segmentation.

Once the input image has been provided to the appropriate enhancement model, the enhancement model can output an enhanced output image which has been enhanced based on the request. At numeral 4, the output image can be stored in an output storage service instance 116, or other storage location that is accessible to the user via electronic device 104. At numeral 5, the user can retrieve the upscaled image from the output storage service instance 116 and use the output image for further processing.

Figure 3:
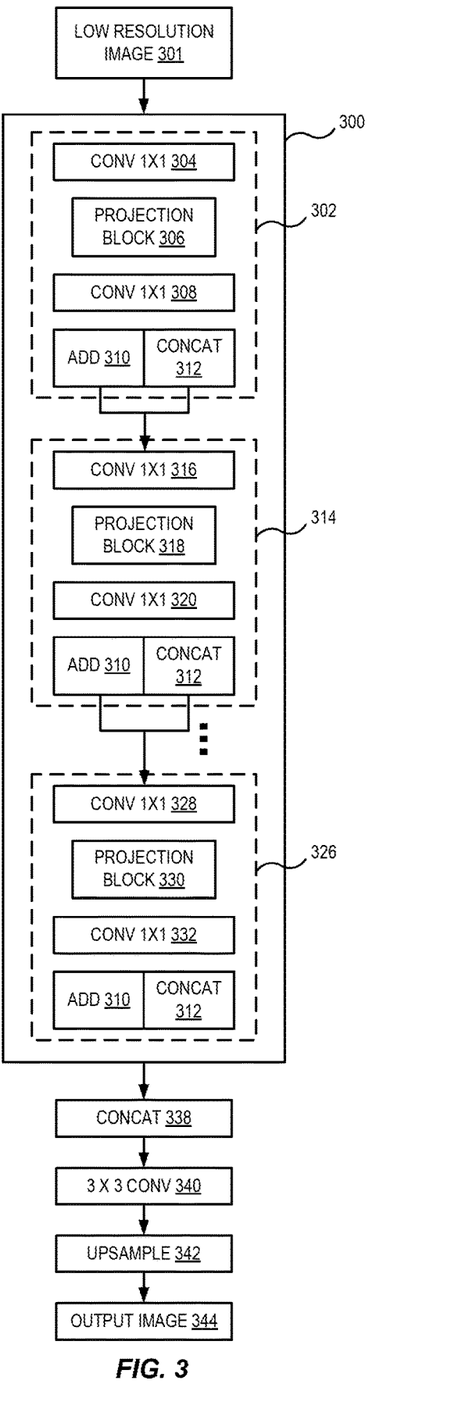
FIG. 3 is a diagram illustrating a machine learning model for machine learning-based image super-resolution according to some embodiments.

FIG. 3 is a diagram illustrating a machine learning model 300 for machine learning-based image super-resolution according to some embodiments. An input image 301 can be provided to model 300. For example, input image 301 can be a low resolution image as described above. The model may include a plurality of layers 302, 314, 326. Although three layers are shown, this is for simplicity of depiction and more or fewer layers may be implemented in model 300. Model 300 may be implemented as a "dual path" network which makes use of both a dense network path and a residual network path. The dense network path improves exploration of new features within the input image 300 and the residual path promotes gradient flow.

When an input image is received, it is divided into patches by 1×1 convolution block 304 (e.g., a convolution block with kernel size equal to 1), this reduces the number of multiplications being performed. The resulting patches are passed to projection block 306. Each patch can then be processed by projection block 306. Each layer 302, 314, 326 can include a projection block 306, 314, 330. In some embodiments, each projection block can be a back projection block and the layers can alternate between an up back projection block and a down back projection block. In the example shown in FIG. 3, the first layer 302 can include an up back projection block 306 and the second layer can include a down back projection block 318. The layers can alternate with each odd layer including an up back projection block and each even layer including a down back projection block.

Each up back projection block can be used to enhance high frequency information in the image data (e.g., edges and other sharp features). For example, the up projection block can upscale and then downscale each patch to determine the high frequency information that is lost and identify features corresponding to that information. A second 1×1 convolution 308 can then be performed to maintain the shape of the resulting data so that it can be passed to the next layer. Each patch can be divided into two structures after the second 1×1 convolution 308, 320, 332: a first structure is the residual network (64 feature maps for example), and a second structure that keeps partitioning the input space into more and more features to form a dense network. For example, the dense network information can be concatenated 312 into the input of the next layer 314 and the residual network information can be added 310 into the input of the next layer. In the second layer 314, the input can again pass through a 1×1 convolution block 316 and then to down back projection block 218. The down back projection block can downscale and then upscale the input to identify low frequency information. The layers may continue alternating between up back projection blocks and down back projection blocks until all of the layers have processed the low resolution input image 301. The result can be concatenated 338 before being passed through a 3×3 convolution block 340 (e.g., a kernel size equal to three) and upscaled 342. The resulting upscaled output image 344 can then be stored to a storage location accessible to the user.

The Dual Path Deep Back Projection Network can process the image more quickly than past techniques using fewer parameters. This enables such a model to be used for image and video compression. In such an example, the image and/or video data can be downscaled for storage and then upscaled using the network when it is to be viewed. For example, it can be implemented at edge servers of a content delivery network to upscale video data. Additionally, the architecture of the DPDBPN produces a parsimonious model, that is one a lightweight model that is faster to run and requires fewer resources such as memory. By including a logic block (e.g., the projection blocks or a 3×3 convolution block) between 1×1 convolution blocks (or other dimension-reducing convolution blocks), the number of features being processed by the logic block is reduced. Additionally, the use of both residual and dense paths connecting the layers reduces the number of redundant features that are extracted and processed, also reducing the parameters of the model.

Figure 4:
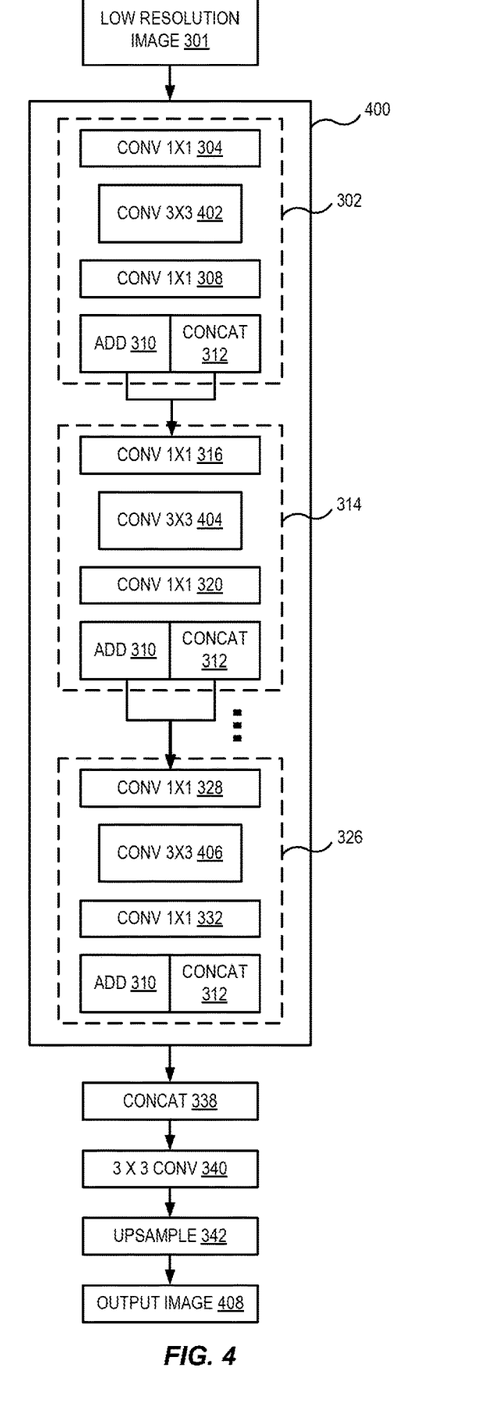
FIG. 4 is a diagram illustrating an alternative machine learning model for machine learning-based image super-resolution according to some embodiments.

FIG. 4 is a diagram illustrating an alternative machine learning model 400 for machine learning-based image super-resolution according to some embodiments. In an alternative model, the projection block in each layer can be replaced with an alternative logic block. The projection block is a submodule and can be replaced with other options, such as a convolution block. For example, a wider convolution block, such as a 3×3 convolution block 402, 404, 406, can replace the projection blocks. In such an example, the upscaling and downscaling of each projection block will not be performed and instead a 3×3 convolution of the input data is performed, while retaining the overall network backbone of 1×1 convolution blocks and the addition and concatenation blocks. This may result in a larger number of feature maps and more parameters the projection block is the logic of the network. In some embodiments, the projection block may alternatively be replaced by a channel block, which can perform classification and/or super-resolution on each channel of the input data in each layer. For example, an image with red, blue, and green values can each be analyzed separately by the channel block. The result can be concatenated 338 before being passed through a 3×3 convolution block 340 and upscaled 342. The resulting upscaled output image 408 can then be stored to a storage location accessible to the user.

Figure 5:
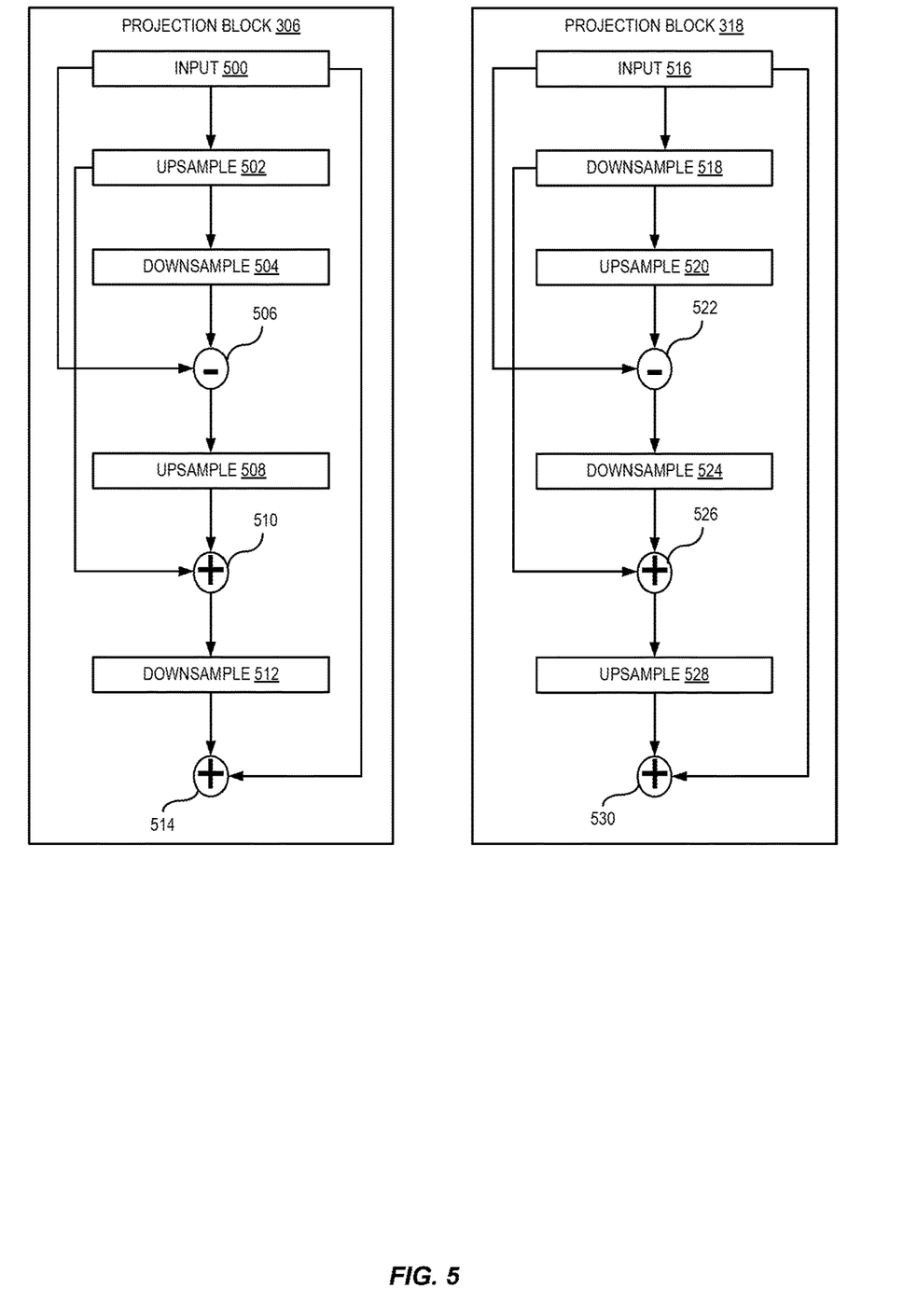
FIG. 5 is a diagram illustrating projection blocks used for machine learning-based image super-resolution according to some embodiments.

FIG. 5 is a diagram illustrating projection blocks used for machine learning-based image super-resolution according to some embodiments. As discussed, the Dual Path Deep Back Projection Network can include a projection block in each layer. The up back projection block 306 can enhance high frequency information in the image data and the down back projection block 318 can identify the low frequency information in the image data. Up back projection block 306 can receive an input 500, such as a patch of an input low resolution image that has passed through a 1×1 convolution block. The input 500 can be upsampled 502 and then down sampled 504. This process of blind upsampling and downsampling effectively removes the high frequency data from the input 500. The result can be subtracted from the original input 500, leaving the high frequency component of the input 500 following the subtraction block 506. This high frequency component can then be upsampled 508 and added 510 to the blind upsample 502, enhancing the high frequency component in the image data and creating a refined upsample. This refined upsample component can then be downsampled 512 and added 514 back to the original input.

Down back projection block 318 be used to better identify low frequency information in the input data 516. The down back projection block 318 can receive an input 516 from a previous layer. The input can be downsampled 518 and then upsampled 520, leaving the high frequency component of the input data. This can then be subtracted 522 from the input, leaving the low frequency component of the input data. This can then be downsampled 524 and added to the blind downsample 518 to generate a refined downs ample. The refined downs ample component can then be upsampled 528 and added 530 back to the original input.

Figure 6:
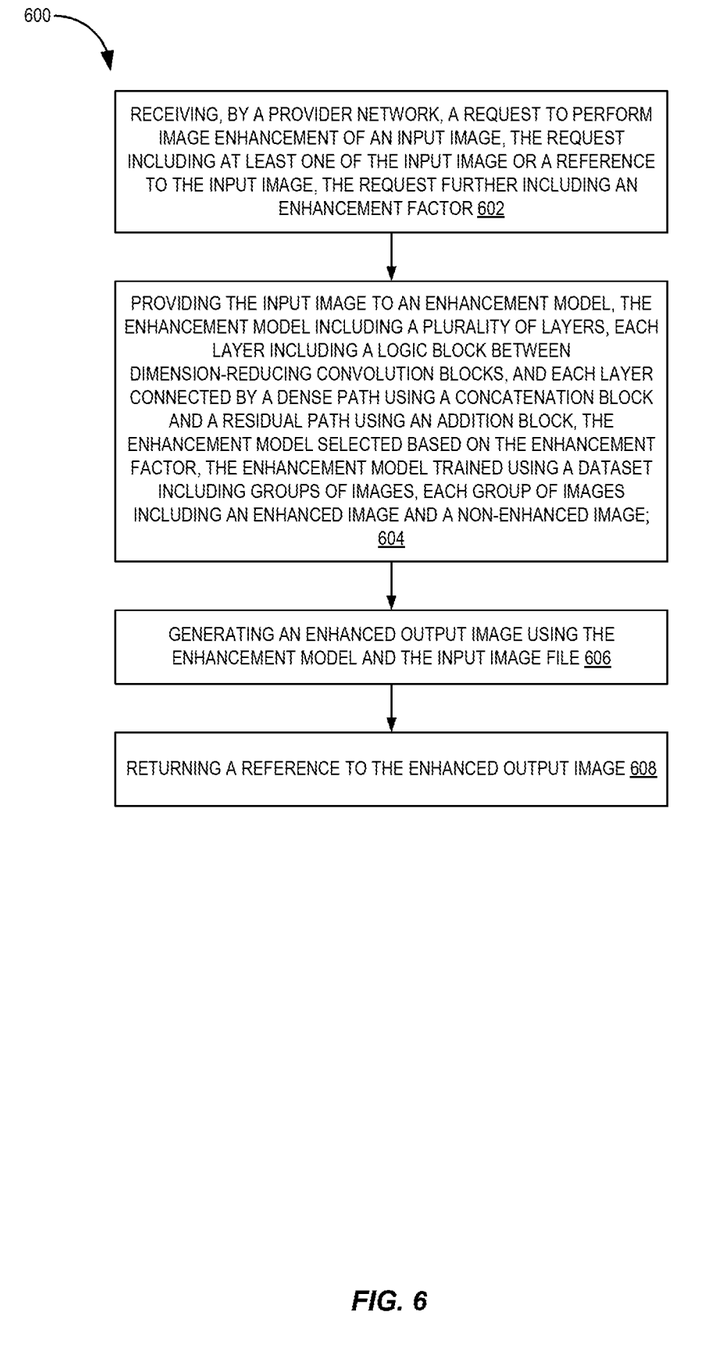
FIG. 6 is a flow diagram illustrating operations of a method for machine learning-based image super-resolution according to some embodiments.

FIG. 6 is a flow diagram illustrating operations 600 of a method for machine learning-based image super-resolution according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by image enhancement service 102 of the other figures.

The operations 600 include, at block 602, receiving, by a provider network, a request to perform image enhancement of an input image, the request including at least one of the input image or a reference to the input image, the request further including an enhancement factor. In some embodiments, image enhancement includes super-resolution imaging, the enhancement factor is a scaling factor, and the enhancement model is trained to provide upscaling at the scaling factor.

The operations 600 include, at block 604, providing the input image to an enhancement model, the enhancement model including a plurality of layers, each layer including a logic block between dimension-reducing convolution blocks, and each layer connected by a dense path using a concatenation block and a residual path using an addition block, the enhancement model selected based on the enhancement factor, the enhancement model trained using a dataset including groups of images, each group of images including an enhanced image and a non-enhanced image. In some embodiments, the input image is a frame of an input video. In some embodiments, the enhancement model is trained to provide one of a low light enhancement, blur reduction, or upscaling.

The operations 600 include, at block 606, generating an enhanced output image using the enhancement model and the input image file. In some embodiments, generating an enhanced output image may include providing the enhanced output image to a post processor to analyze the enhanced output image, the post processor including at least one of a classifier, an object detector, or an image segmentation processor, and returning post processing data associated with the enhanced output image, the post processing data including one or more of an object label, bounding box, or image segment. The operations 600 include, at block 608, returning a reference to the enhanced output image.

In some embodiments, the logic block comprises a projection block in each layer of the enhancement model. The projection block in a first layer of the enhancement model and in each subsequent odd layer includes an up-projection block to enhance high frequency information in the input image, and the projection block in a second layer of the enhancement model and in each subsequent even layer includes a down-projection block to identify low frequency information in the input image. In some embodiments, the logic block comprises a convolution block in each layer of the enhancement model, the convolution block having a kernel size greater than the dimension-reducing convolution blocks.

In some embodiments, the operations 600 may include receiving, by a provider network, a request to perform super-resolution imaging of an input image, the request including a reference to the input image and a scaling factor. The operations 600 may further include identifying an upscaling model trained using a data set corresponding to the scaling factor. The operations 600 may further include providing, using the reference, a copy of the image to the instance of the image enhancement service. The operations 600 may further include generating an upscaled output image using the upscaling model and the copy of the input image file. The operations 600 may further include storing the upscaled output image to a data store in the provider network. The operations 600 may further include returning a reference to the upscaled output image.

Figure 7:
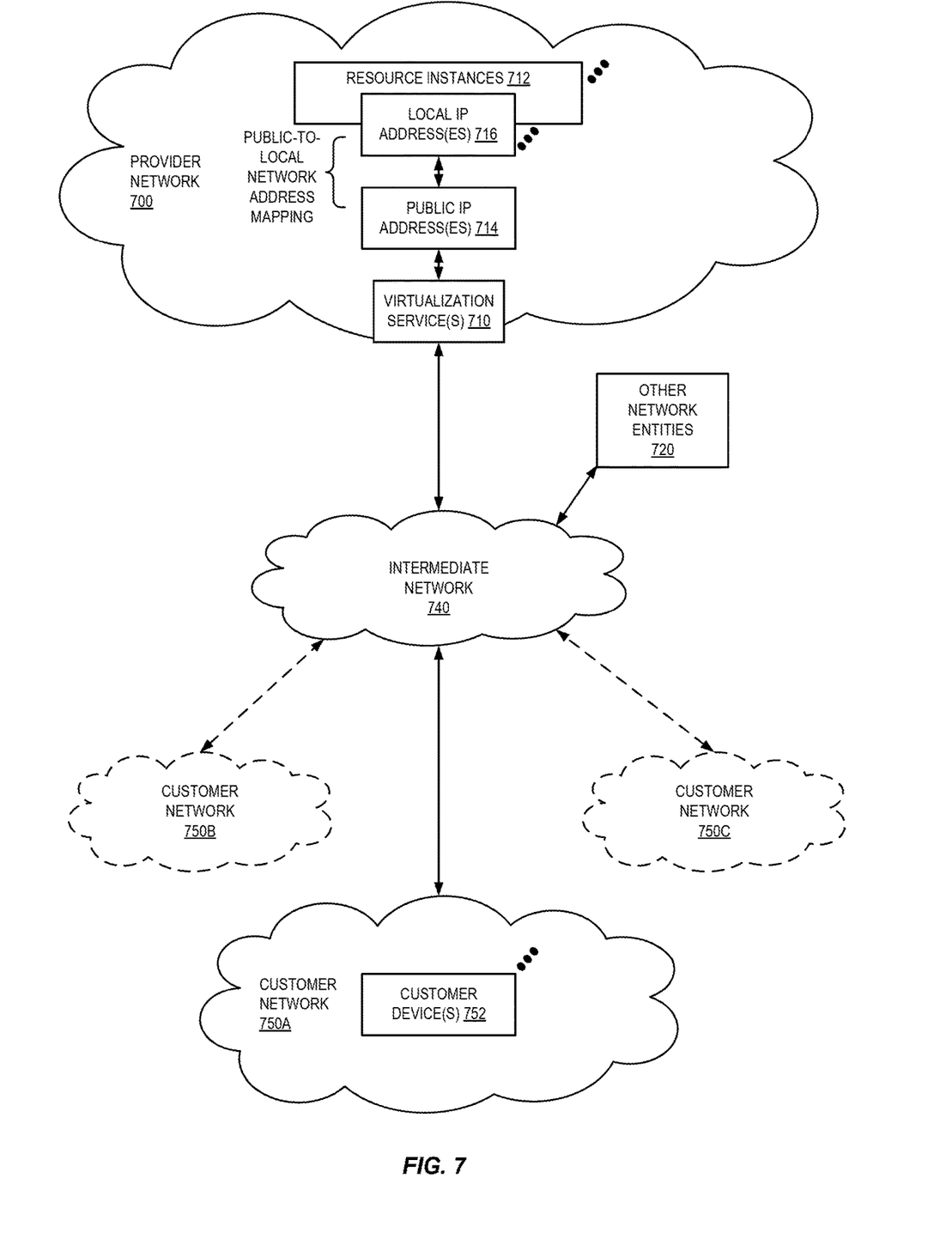
FIG. 7 illustrates an example provider network environment according to some embodiments.

FIG. 7 illustrates an example provider network (or "service provider system") environment according to some embodiments. A provider network 700 may provide resource virtualization to users via one or more virtualization services 710 that allow users to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that users may obtain from the provider 700.

Conventionally, the provider network 700, via the virtualization services 710, may allow a user of the service provider (e.g., a user that operates one or more client networks 750A-750C including one or more user device(s) 752) to dynamically associate at least some public IP addresses 714 assigned or allocated to the user with particular resource instances 712 assigned to the user. The provider network 700 may also allow the user to remap a public IP address 714, previously mapped to one virtualized computing resource instance 712 allocated to the user, to another virtualized computing resource instance 712 that is also allocated to the user. Using the virtualized computing resource instances 712 and public IP addresses 714 provided by the service provider, a user of the service provider such as the operator of user network(s) 750A-750C may, for example, implement user-specific applications and present the user's applications on an intermediate network 740, such as the Internet. Other network entities 720 on the intermediate network 740 may then generate traffic to a destination public IP address 714 published by the user network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the user. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by users of the provider network 700; a user may then assign their allocated public IP addresses to particular resource instances allocated to the user. These public IP addresses may be referred to as user public IP addresses, or simply user IP addresses. Instead of being assigned by the provider network 700 to resource instances as in the case of standard IP addresses, user IP addresses may be assigned to resource instances by the users, for example via an API provided by the service provider. Unlike standard IP addresses, user IP addresses are allocated to user accounts and can be remapped to other resource instances by the respective users as necessary or desired. A user IP address is associated with a user's account, not a particular resource instance, and the user controls that IP address until the user chooses to release it. Unlike conventional static IP addresses, user IP addresses allow the user to mask resource instance or availability zone failures by remapping the user's public IP addresses to any resource instance associated with the user's account. The user IP addresses, for example, enable a user to engineer around problems with the user's resource instances or software by remapping user IP addresses to replacement resource instances.

Figure 8:
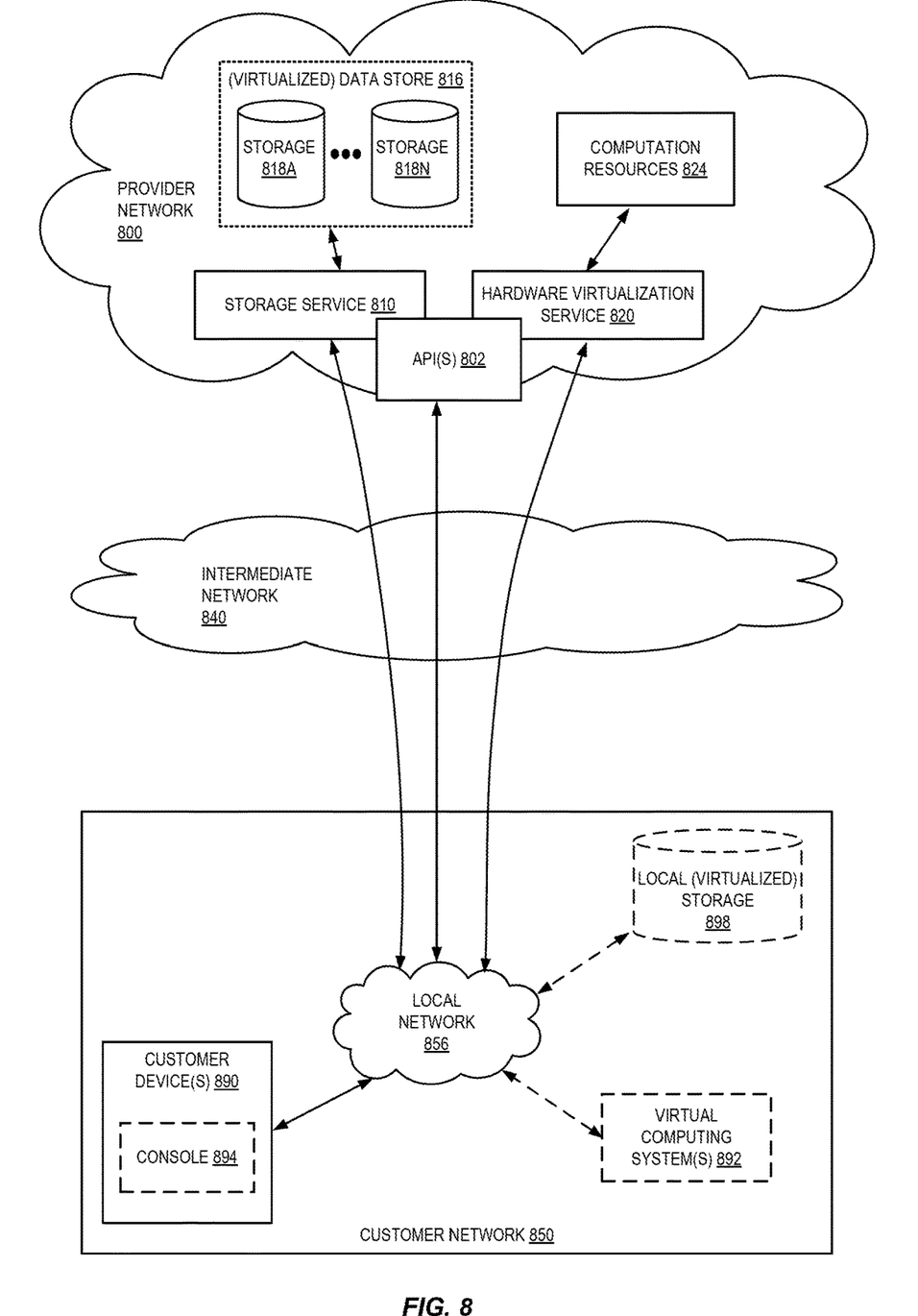
FIG. 8 is a block diagram of an example provider network that provides a storage service and a hardware virtualization service to users according to some embodiments.

FIG. 8 is a block diagram of an example provider network that provides a storage service and a hardware virtualization service to users, according to some embodiments. Hardware virtualization service 820 provides multiple computation resources 824 (e.g., VMs) to users. The computation resources 824 may, for example, be rented or leased to users of the provider network 800 (e.g., to a user that implements user network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a user network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a user network 850 may access functionality provided by the hardware virtualization service 820, for example via a console 894 (e.g., a web-based application, standalone application, mobile application, etc.). In some embodiments, at the provider network 800, each virtual computing system 892 at user network 850 may correspond to a computation resource 824 that is leased, rented, or otherwise provided to user network 850.

From an instance of a virtual computing system 892 and/or another user device 890 (e.g., via console 894), the user may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the user network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another user device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a user, appliance service provider, or other entity may access a virtualization service from within a respective virtual network on the provider network 800 via an API 802 to request allocation of one or more resource instances within the virtual network or within another virtual network.

Figure 9:
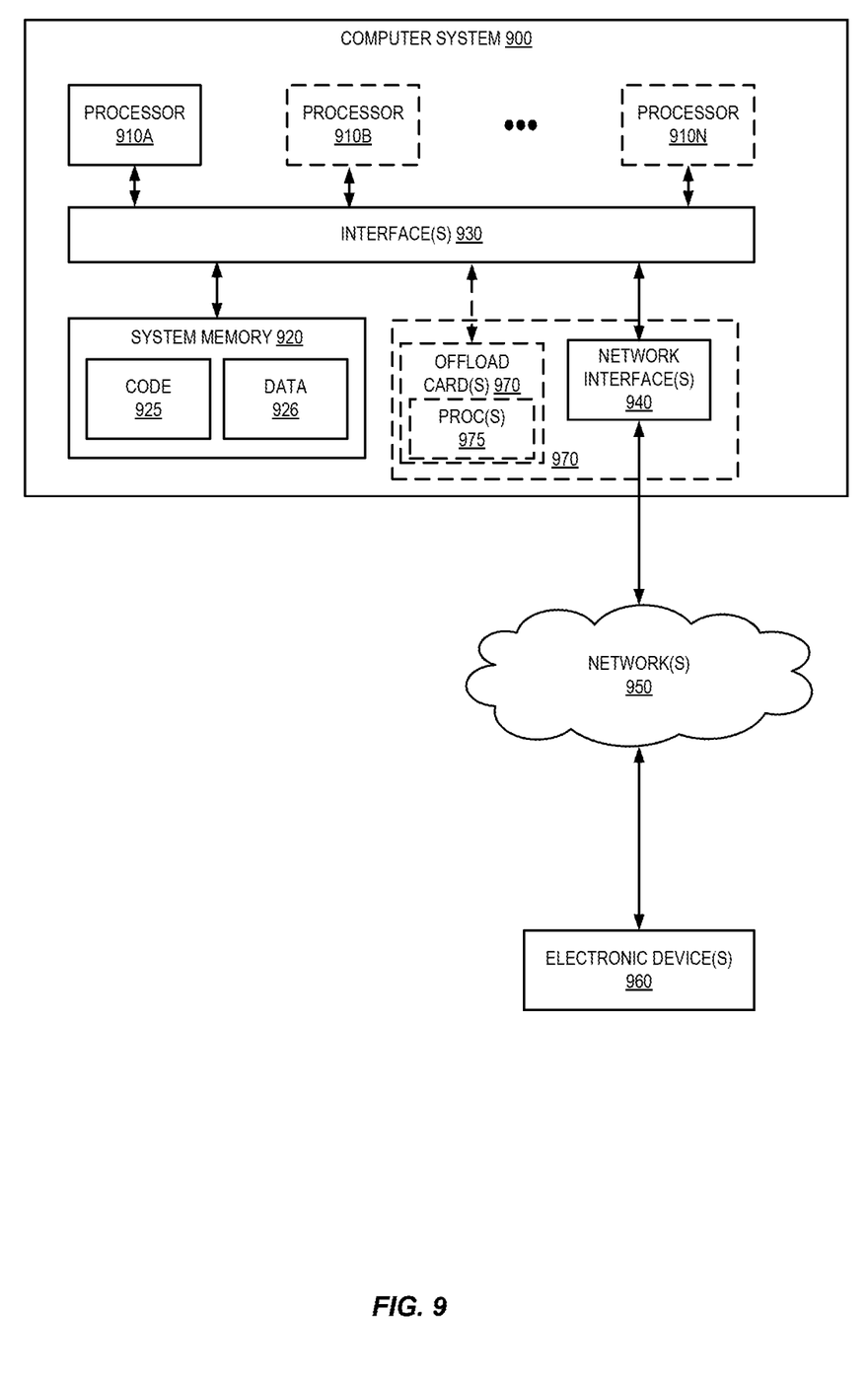
FIG. 9 is a block diagram illustrating an example computer system that may be used in some embodiments.

In some embodiments, a system that implements a portion or all of the techniques for machine learning-based image super-resolution according as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 110A, 110B, 110C, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a provider network, a request to perform super-resolution imaging of an input image, the request including a reference to the input image and a scaling factor;
identifying an upscaling model trained using a data set corresponding to the scaling factor, the upscaling model including a plurality of layers, each layer including a logic block between dimension-reducing convolution blocks, wherein the logic block in each odd layer comprises an up back projection block which identifies a high frequency component of an input by upsampling and then downsampling the input, and enhances high frequency information in the input image and wherein the logic block in each even layer comprises a down back projection block which identifies a low frequency component of an input from a previous layer by downsampling and then upsampling the input to enhance low frequency information in the input image, and each layer connected by a dense path using a concatenation block and a residual path using an addition block;
providing, using the reference, a copy of the input image to an instance of an image enhancement service;
generating an upscaled output image using the upscaling model and the copy of the input image;
storing the upscaled output image to a data store in the provider network; and
returning a reference to the upscaled output image.

2. A computer-implemented method comprising:
receiving, by a provider network, a request to perform image enhancement of an input image, the request including at least one of the input image or a reference to the input image, the request further including an enhancement factor;
providing the input image to an enhancement model, the enhancement model including a plurality of layers, each layer including a logic block between dimension-reducing convolution blocks, wherein the logic block in each odd layer comprises an up back projection block which identifies a high frequency component of an input by upsampling and then downsampling the input, and enhances high frequency information in the input image and wherein the logic block in each even layer comprises a down back projection block which identifies a low frequency component of an input from a previous layer by downsampling and then upsampling the input to enhance low frequency information in the input image, and each layer connected by a dense path using a concatenation block and a residual path using an addition block, the enhancement model selected based on the enhancement factor, the enhancement model trained using a dataset including groups of images, each group of images including an enhanced image and a non-enhanced image;
generating an enhanced output image using the enhancement model and the input image; and
returning a reference to the enhanced output image.

3. The computer-implemented method of claim 2, wherein image enhancement includes super-resolution imaging, the enhancement factor is a scaling factor, and the enhancement model is trained to provide upscaling at the scaling factor.

4. The computer-implemented method of claim 3, wherein the logic block comprises a projection block in each layer of the enhancement model.

5. The computer-implemented method of claim 2, wherein the logic block comprises a convolution block in each layer of the enhancement model, the convolution block having a kernel size greater than the dimension-reducing convolution blocks.

6. The computer-implemented method of claim 2, wherein the input image is a frame of an input video.

7. The computer-implemented method of claim 2, wherein generating an enhanced output image using the enhancement model and the input image, further comprises:
providing the enhanced output image to a post processor to analyze the enhanced output image, the post processor including at least one of a classifier, an object detector, or an image segmentation processor; and
returning post processing data associated with the enhanced output image, the post processing data including one or more of an object label, bounding box, or image segment.

8. The computer-implemented method of claim 2, wherein the enhancement model is trained to provide one of a low light enhancement, blur reduction, upscaling, or artifact removal.

9. A system comprising:
a storage service implemented by a first one or more electronic devices; and
an image enhancement service implemented by a second one or more electronic devices, the image enhancement service including instructions that upon execution cause the image enhancement service to:
receive a request to perform image enhancement of an input image, the request including a reference to the input image stored in an instance of the storage service, the request further including an enhancement factor;
provide the input image to an enhancement model, the enhancement model including a plurality of layers, each layer including a logic block between dimension-reducing convolution blocks, wherein the logic block in each odd layer comprises an up back projection block which identifies a high frequency component of an input by upsampling and then downsampling the input, and enhances high frequency information in the input image and wherein the logic block in each even layer comprises a down back projection block which identifies a low frequency component of an input from a previous layer by downsampling and then upsampling the input to enhance low frequency information in the input image, and each layer connected by a dense path using a concatenation block and a residual path using an addition block, the enhancement model selected based on the enhancement factor, the enhancement model trained using a dataset including groups of images, each group of images including an enhanced image and a non-enhanced image;

generate an enhanced output image using the enhancement model and the input image; and return a reference to the enhanced output image.

10. The system of claim 9, wherein image enhancement includes super-resolution imaging, the enhancement factor is a scaling factor, and the enhancement model is trained to provide upscaling at the scaling factor.

11. The system of claim 10, wherein the logic block comprises a projection block in each layer of the enhancement model.

12. The system of claim 9, wherein the logic block comprises a convolution block in each layer of the enhancement model, the convolution block having a kernel size greater than the dimension-reducing convolution blocks.

13. The system of claim 9, wherein the input image is a frame of an input video.

14. The system of claim 9, wherein to generate an enhanced output image using the enhancement model and the input image, the instructions, when executed, further cause the image enhancement service to:

provide the enhanced output image to a post processor to analyze the enhanced output image, the post processor including at least one of a classifier, an object detector, or an image segmentation processor; and return post processing data associated with the enhanced output image, the post processing data including one or more of an object label, bounding box, or image segment.

* * * * *